US012052951B2

(12) United States Patent
Ricketts et al.

(10) Patent No.: US 12,052,951 B2
(45) Date of Patent: Aug. 6, 2024

(54) REMOTELY ADJUSTABLE ROW DIVIDER FOR AN AGRICULTURAL HARVESTER

(71) Applicant: CNH Industrial America LLC, New Holland, PA (US)

(72) Inventors: Jonathan E. Ricketts, Davenport, IA (US); Brett Gutknecht, Cedar Falls, IA (US); Nate McGraw, Macomb, IL (US); Adam L. Hession, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 640 days.

(21) Appl. No.: 17/291,672

(22) PCT Filed: Nov. 6, 2019

(86) PCT No.: PCT/US2019/060107
§ 371 (c)(1),
(2) Date: May 6, 2021

(87) PCT Pub. No.: WO2020/097229
PCT Pub. Date: May 14, 2020

(65) Prior Publication Data
US 2022/0000029 A1    Jan. 6, 2022

Related U.S. Application Data

(60) Provisional application No. 62/756,381, filed on Nov. 6, 2018.

(51) Int. Cl.
*A01D 57/01*    (2006.01)
*A01D 57/22*    (2006.01)
*A01D 45/02*    (2006.01)

(52) U.S. Cl.
CPC ............ *A01D 57/01* (2013.01); *A01D 57/22* (2013.01); *A01D 45/028* (2013.01)

(58) Field of Classification Search
CPC ...... A01D 57/01; A01D 57/22; A01D 45/028; A01D 45/021
See application file for complete search history.

(56) References Cited

U.S. PATENT DOCUMENTS 1,690,809 A * 11/1928 Barnard ............... A01D 45/028
                                                56/13.5
2,473,978 A *  6/1949 Van Buskirk .......... A01D 63/04
                                                56/119
3,214,894 A   11/1965 Whitman
(Continued)

FOREIGN PATENT DOCUMENTS

DE          3614724 A1 * 11/1987  .......... A01D 45/021
WO       2018/057496 A1    3/2018
WO    WO-2020077203 A1 *  4/2020  ............. A01D 45/02

OTHER PUBLICATIONS

PCT International Search Report for PCT application PCT/US2019/060107, mailed Mar. 25, 2020 (10 pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

A header for an agricultural vehicle includes: a header frame; at least one crop remover carried by the header frame; a plurality of row dividers pivotably carried by the header frame; and at least one divider lifter coupled to at least one of the row dividers and configured to activate in order to pivot the coupled at least one row divider relative to the header frame. The at least one divider lifter is configured to be selectively activated by a remote controller.

14 Claims, 6 Drawing Sheets

(56) References Cited

U.S. PATENT DOCUMENTS

| | | | |
|---|---|---|---|
| 3,271,940 A * | 9/1966 | Ashton | A01D 41/141 56/119 |
| 3,380,233 A * | 4/1968 | Fergason | A01D 63/04 56/119 |
| 3,460,323 A * | 8/1969 | Schnaidt | A01D 46/08 56/15.7 |
| 3,722,193 A * | 3/1973 | Strubbe | A01D 41/141 56/208 |
| 4,227,368 A * | 10/1980 | Mossman | A01D 45/021 56/106 |
| 4,307,560 A | 12/1981 | Swanson | |
| 4,329,835 A * | 5/1982 | Pucher | A01D 45/021 56/320.1 |
| 4,445,314 A * | 5/1984 | Gust | A01D 41/147 56/130 |
| 4,700,537 A * | 10/1987 | Emmert | A01D 63/04 56/119 |
| 4,757,673 A * | 7/1988 | Gayman | A01D 63/04 56/119 |
| 5,195,309 A | 3/1993 | Mossman | |
| 5,704,200 A * | 1/1998 | Chmielewski, Jr. | A01D 41/141 56/DIG. 15 |
| 6,247,297 B1 * | 6/2001 | Becker | A01D 45/021 56/119 |
| 6,513,313 B1 * | 2/2003 | Bennett | A01D 45/021 56/319 |
| 7,240,471 B2 | 7/2007 | Mossman | |
| 8,141,331 B2 * | 3/2012 | Bich | A01D 63/04 56/15.8 |
| 9,032,700 B2 | 5/2015 | Lohrentz et al. | |
| 9,173,345 B2 | 11/2015 | Cressoni | |
| 10,674,652 B2 * | 6/2020 | Ricketts | A01D 63/04 |
| 11,375,666 B2 * | 7/2022 | Baes | A01D 63/00 |
| 2003/0226342 A1 * | 12/2003 | Boeckmann | A01D 41/144 56/14.7 |
| 2006/0174603 A1 | 8/2006 | Mossman | |
| 2008/0092507 A1 | 4/2008 | Bollig | |
| 2012/0291410 A1 * | 11/2012 | Silver | A01D 45/021 56/119 |
| 2014/0130474 A1 * | 5/2014 | Hulstein | A01D 45/021 56/119 |
| 2014/0260165 A1 * | 9/2014 | Lohrentz | A01D 63/00 56/119 |
| 2016/0183466 A1 * | 6/2016 | Long | A01D 57/22 56/119 |
| 2019/0230841 A1 * | 8/2019 | Walker | A01D 45/021 |

* cited by examiner

REMOTELY ADJUSTABLE ROW DIVIDER FOR AN AGRICULTURAL HARVESTER

FIELD OF THE INVENTION

The present invention relates generally to agricultural harvesters and, more particularly, to agricultural harvesters with headers that have row dividers.

BACKGROUND OF THE INVENTION

The header of an agricultural harvester or combine is provided with row dividers for directing rows of crops and crop material, such as corn stalks with corn ears, to downstream separation devices, such as row units. For harvesting corn, the row dividers, which are commonly known as "snouts," direct the corn stalks to row units including stalk receiving slots and stripping plates, snapping rolls, and opposed rearwardly moving gathering chains. Thus, e.g., following separation of ears from stalks by the snapping rolls and stripping plates (also known as stalk rolls and deck plates, respectively), the separated ears are delivered by the gathering chains to an auger which conveys the harvested ears to a feederhouse of the combine. Harvested ears are then processed to the combine's inner chambers for downstream processing.

Row unit frames are typically constructed with forwardly projecting members that support several components of the row unit including the deck plates, the stalk roll support bearings, the front gathering chain idlers, the hoods and the row dividers. The deck plates are flat or planar with their shape being dictated by the geometry of the row unit frames. As is known, the stalk rolls are disposed beneath the deck plates and are cooperatively rotated to pull the corn stalks downwardly into the stalk receiving slots where the ears come into contact with the deck plates and are snapped off of the stalks by the deck plates. The deck plates lie generally tangent to the upper surfaces of the stalk rolls and the stalk rolls engage the corn stalks at "pinch points" situated below the upper surfaces of deck plates. The deck plates are generally provided in pairs defining a gap therebetween, allowing the corn stalks to enter the gap before being pulled down to the deck plates so the corn ear snaps off the stalk.

To transport the header, which may be detached from the rest of the harvester, the snouts of the header are often raised prior to being placed onto a transport trailer. As headers become increasingly wide and have an increasing number of row dividers, such as 12 or 16 row dividers, the time that it takes to prepare the header for transport has also increased.

What is needed in the art is a convenient way to prepare a header for transport.

SUMMARY OF THE INVENTION

Exemplary embodiments of the present disclosure provide a header with a divider lifter that is activatable by a remote controller to pivot, and thus raise or lower, one or more row dividers of the header.

In some embodiments formed in accordance with the present disclosure, a header for an agricultural harvester is provided. The header includes: a header frame; at least one crop remover carried by the header frame; a plurality of row dividers pivotably carried by the header frame; and at least one divider lifter coupled to at least one of the row dividers and configured to activate in order to pivot the coupled at least one row divider relative to the header frame, the at least one divider lifter configured to be selectively activated by a remote controller.

In some embodiments formed in accordance with the present invention, an agricultural harvester is provided. The agricultural harvester includes a chassis and a header carried by the chassis. The header includes: a header frame; at least one crop remover carried by the header frame; a plurality of row dividers pivotably carried by the header frame; and at least one divider lifter coupled to at least one of the row dividers and configured to activate in order to pivot the coupled at least one row divider relative to the header frame. A controller is carried by the chassis remotely from the header and is configured to selectively activate the at least one divider lifter by outputting a signal to the at least one divider lifter or to a power source coupled to the at least one divider lifter.

In some embodiments disclosed herein, a method of adjusting at least one row divider of a header of an agricultural harvester, the header including a header frame and the at least one row divider pivotably carried by the header frame, is provided. The method includes: outputting an electronic signal from a controller to activate a divider lifter coupled to the at least one row divider, the controller being remote from the header; and pivoting the at least one row divider using the activated divider lifter.

One advantage that may be realized by exemplary embodiments provided in accordance with the present disclosure is that the row dividers can be raised and lowered by, for example, using a control system provided in an operating cab of the harvester, which is more convenient than known ways of raising and lowering the row dividers.

Another advantage that may be realized by exemplary embodiments provided in accordance with the present disclosure is that the row dividers may be raised and lowered on-the-go to, for example, raise row dividers that will not be in contact with standing crop material.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

DETAILED DESCRIPTION OF THE INVENTION

Figure 1:
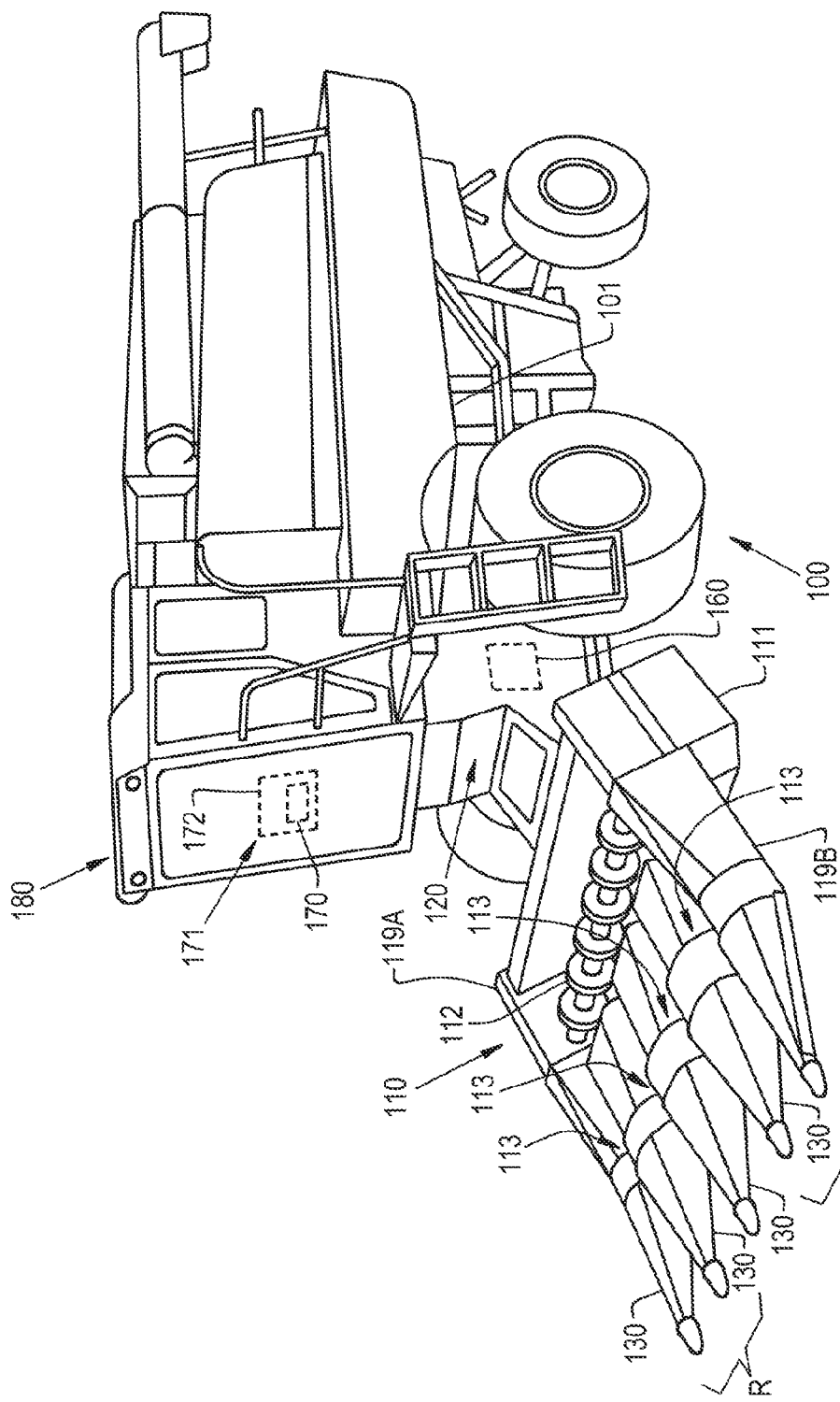
FIG. 1 is a perspective view of an exemplary embodiment of an agricultural harvester provided in accordance with the present disclosure.

Referring now to the drawings, FIG. 1 illustrates an exemplary embodiment of an agricultural harvester such as a combine 100 including a chassis 101 carrying a header 110, shown as a corn header, in accordance with the present invention. The header 110 is shown to be operatively carried by the chassis 101 for harvesting e.g., cutting corn and feeding the corn to a feederhouse for receiving crop residue, cutting, chopping and propelling the residue rearwardly and outwardly from the agricultural harvester 100 while retaining the valuable corn ears and kernels. Such feederhouses and harvesting operations are known in the art and a further detailed description of their structure, function and operation is thus omitted. Alternatively, the header 110 can be connected to any device that may have use for a corn header. It should be appreciated that while the harvester 100 is illustrated and described herein as being for harvesting corn, the harvester 100 may be modified for harvesting other crops such as, for example, grain, with such modifications being known.

Figure 2:
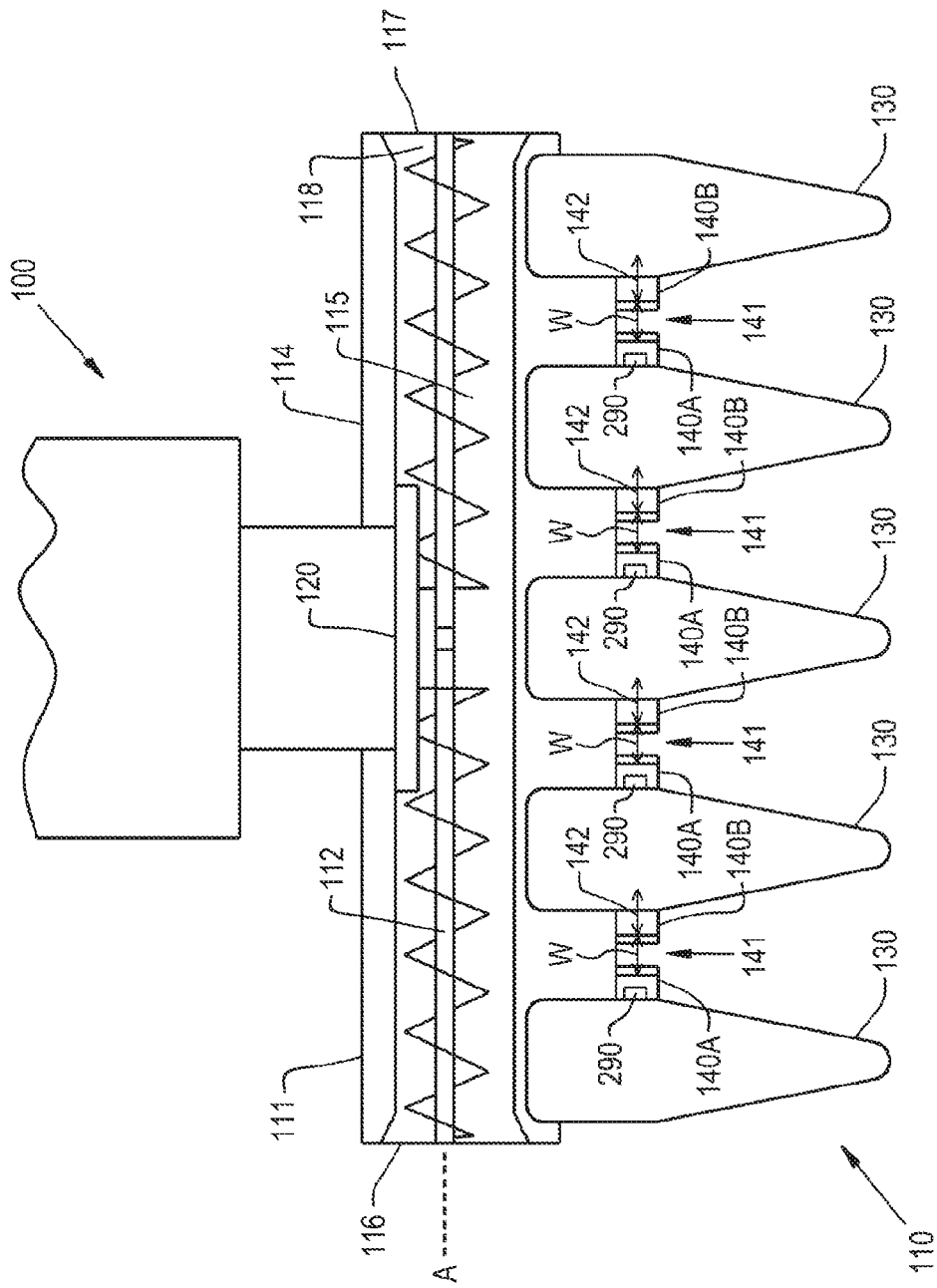
FIG. 2 is a top view of a portion of the agricultural harvester illustrated in FIG. 1.

Referring to FIGS. 1 and 2, the header 110 includes a header frame 111 for mounting to a forward end of the agricultural harvester 100, a conveyor 112 (such as an auger) extending lengthwise across the header frame 111 for conveying crop material to a combine feeding location or feederhouse 120, and a plurality of row units 113 extending forwardly from the header frame 111. In the shown exemplary embodiment, the header frame 111 can be configured as a substantially rectangular frame; in other exemplary embodiments, the header frame 111 can be configured in different shapes. As illustrated in FIG. 2, the header frame 111 includes a rear wall 114, a bottom wall 115 and a pair of side walls 116, 117. The header frame 111 further includes a channel 118 formed partially by the bottom wall 115. The conveyor 112 conveys harvested corn along the channel 118 to the combine feeding location 120 located adjacent a midpoint of the channel 118.

The conveyor 112 can be a screw auger conveyor, but can alternatively be any conveyor capable of moving collected crop material through the channel 118, such as a paddle system, a conveyor belt, a pressure based system, or any combination thereof. Such conveyors are known and a further detailed description of their structure, function and operation is thus omitted. However, exemplary augers applicable to the present disclosure are disclosed in U.S. Pat. Nos. 8,267,240 and 4,621,968, the entire disclosures of which are incorporated by reference herein.

The auger 112 can be connected to the header frame 111 at the side walls 116, 117 and rotates about axis A. The half of the auger 112 that is closest to side wall 116 moves the harvested crop towards the opposite side wall 117 and the half of the auger 112 that is closest to side wall 117 moves the harvested crop towards the opposite side wall 116. The auger 112 is positioned in front or above the combine feeding location 120 and, as the auger 112 rotates, harvested grain moves towards the center of the auger 112 for feeding the harvested grain into the combine feeding location 120.

Referring still to FIGS. 1 and 2, the header 100 includes a plurality of row dividers 130, which may also be referred to as "snouts." The row dividers 130 extend forwardly from the header frame 111 and are connected to extend across a pair of adjacent row units 113, as illustrated in FIG. 1. The dividers 130 extend forwardly from the header frame 111 and are connected to the plurality of row units 113 for directing a row of corn stalks towards crop removers, which may be deck plates 140A, 140B (also commonly known as a stripping plates), of the row units 113, as illustrated in FIG. 2. That is, during harvesting operations, the row dividers 130 direct a row of corn stalk towards deck plates 140A, 140B and stalk stripping rolls situated between adjacent row dividers 130. The row dividers 130 may, for example, connect to respective row hoods 131, as will be described further herein.

The deck plates 140A, 140B form a gap 141 therebetween for receiving corn stalks and, as is known, the stalk stripping rolls pull the stalk downwardly snapping the corn ear when it strikes the deck plates 140A, 140B to remove the corn ear from the field. In this sense, the deck plates 140A, 140B remove crop (corn ears) from a field for collection by the harvester 100. The stalk stripping rolls can pull most of the crop residue down and out of the header 110. It should be appreciated that while the one or more crop removers are illustrated and described as deck plates 140A, 140B for harvesting corn, in some embodiments the harvester 100 includes one or more crop removers for harvesting one or more crops other than corn, e.g., a cutter bar for harvesting wheat.

The deck plates 140A, 140B of the row units 113 can be paired together so the deck plates 140A, 140B include a first deck plate 140A and a second deck plate 140B, the deck plates 140A, 140B forming the gap 141 therebetween. The gap 141, as can be seen, defines a gap width W between the deck plates 140A, 140B and a width direction, indicated by arrow 142, with movement of the deck plates 140A, 140B in the width direction 142 changing the gap width W defined between the deck plates 140A, 140B. As should be appreciated, the gap width W defined between the deck plates 140A, 140B determines the width of stalks that may be admitted into the gap 141 instead of being severed by the deck plates 140A, 140B during harvesting.

Figure 3:
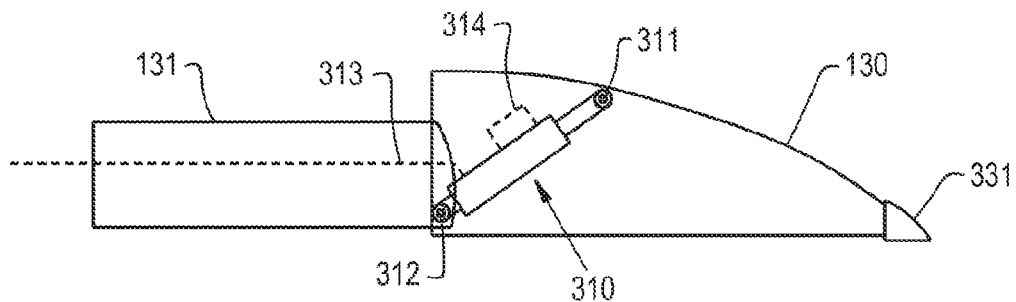
FIG. 3 is a side view of an exemplary embodiment of a row divider and an associated divider lifter of the header illustrated in FIGS. 1-2, the row divider being in an operating position.

Referring now to FIG. 3, an exemplary embodiment of a divider lifter 310 for pivoting one or more of the row dividers 130 is illustrated coupled directly to the row divider 130, which is in an operating position. As illustrated, the divider lifter 310 may be an actuator that fixedly attaches to the row divider 130 at a fixed attachment point 311 and pivotably attaches to the row hood 131 at a pivot point 312, which defines a pivot axis of the actuator 310. In some embodiments, the row divider 130 is also pivotably connected to the row hood 131 such that the pivot axis of the actuator 310 defined by the pivot point 312 also defines a pivot axis of the row divider 130. The actuator 310 may be any type of actuator, e.g., an electrical actuator, a pneumatic actuator, or a hydraulic actuator. In some embodiments, each of the row dividers 130 is connected to a respective divider lifter, such as an actuator 310, for pivoting the row dividers 130, as will be described further herein. Alternatively, a single actuator 310 may cause pivoting of multiple row dividers 130 by, for example, pivotably linking multiple row dividers 130 together such that the pivoting of one row divider 130 causes a corresponding pivoting of the other linked row dividers 130. Multiple row dividers 130 may be pivotably linked together by, for example, a linkage bar connected to each of the linked row dividers 130.

To power the actuator 310, the actuator 310 may include one or more power connectors 313 that are configured to connect with an external power source, such as an electrical, pneumatic, or hydraulic system of the harvester 100, and power operation of the actuator 310. For example, when the actuator 310 is a pneumatic or hydraulic actuator, the power connector 313 may include multiple fluid lines to fluidly couple the actuator 310 to a source of pressurized fluid 160 (illustrated in FIG. 1), which may also be referred to as a power source, carried by the harvester 100. Alternatively, when the actuator 310 is an electric actuator, the power connector 313 may include one or more electrical connectors to electrically couple the actuator 310 to an electrical power source of the harvester 100. In some embodiments, the actuator 310 couples an associated power source 314, such as a battery or pressurized fluid tank, carried by the header 110 so the actuator 310 may operate without power input from a remote system of the harvester 100. The associated power source 314 may be a primary power source of the actuator 310, i.e., the power source 314 normally drives the actuator 310 during operation, or may be a backup power source of the actuator 310 in the event that, e.g., the harvester 100 becomes unable to supply sufficient operating power to the actuator 310 or the actuator 310 is disconnected from the power source 160 carried by the harvester 100.

Figure 4:
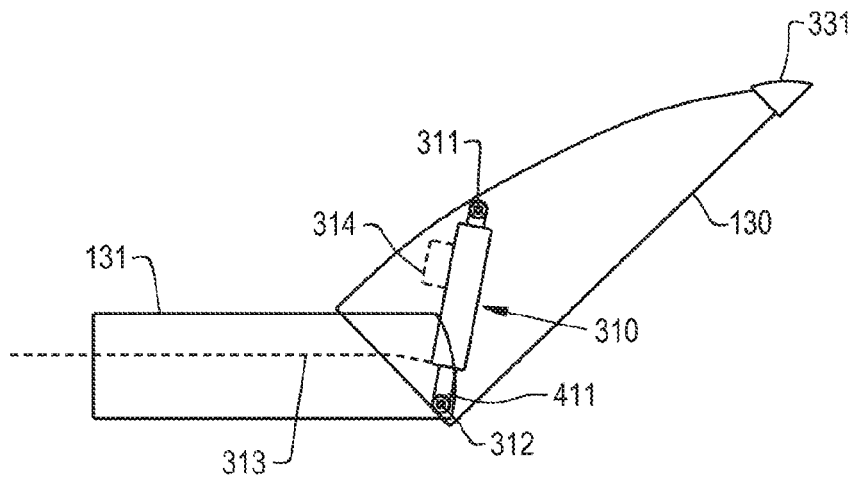
FIG. 4 is a side view of the row divider and the associated divider lifter illustrated in FIG. 3 after the row divider has been pivoted to a raised position by the divider lifter.
Figure 5:
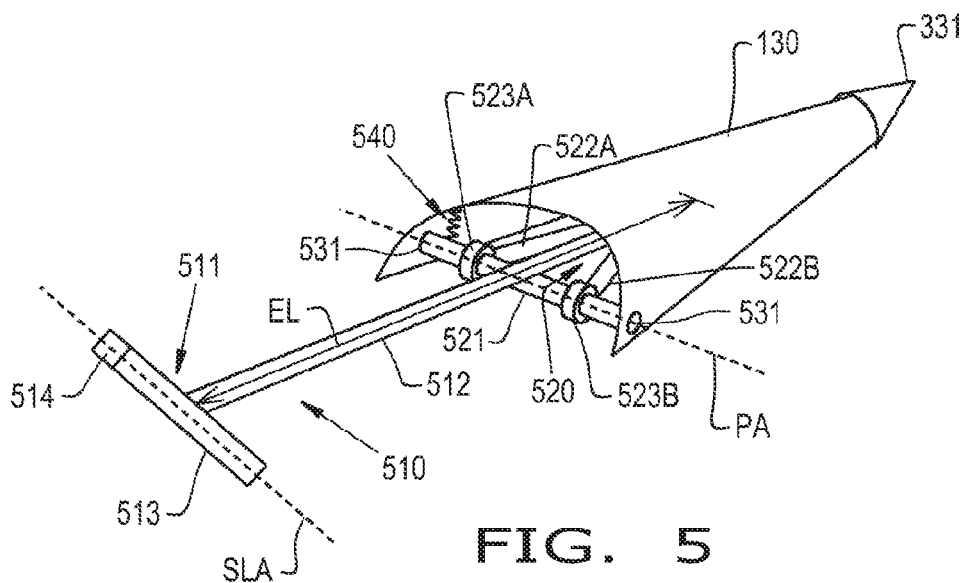
FIG. 5 is a perspective view of a row divider coupled to another exemplary embodiment of a divider lifter that may be incorporated in the header illustrated in FIGS. 1-2.
Figure 6:
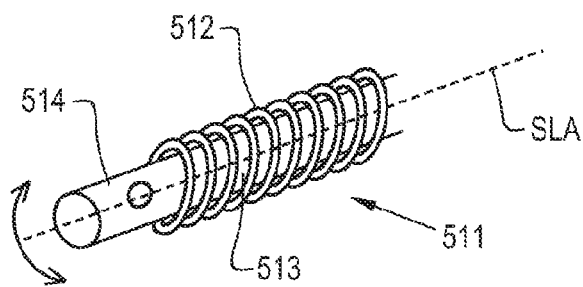
FIG. 6 is a perspective view of a winder of the divider lifter illustrated in FIG. 5 that may be used to raise and lower the row divider illustrated in FIG. 5.
Figure 7:
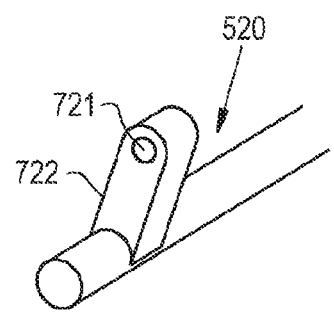
FIG. 7 is a perspective view of an exemplary embodiment of a divider support that may bear on the row divider illustrated in FIG. 5 and connect to the divider lifter illustrated in FIGS. 5-6.

Referring now to FIG. 4, the row divider 130 and the actuator 310 are illustrated after the actuator 310 has activated to pivot the row divider 130 relative to the header frame 111 about the pivot axis 312 and raise a tip 331 of the row divider 130, relative to the ground, so the row divider 130 is in a raised position. To pivot the row divider 130, an actuator rod 411 of the actuator 310 may extend to cause pivoting of the row divider 130 about the pivot axis 312 due to the actuator 310 being fixedly connected to the row divider 130 but pivotably connected to the row hood 131. It should be appreciated that the actuator rod 411 of the actuator 310 can also retract to cause a reverse pivoting action of the row divider 130 about the pivot axis 312 to, for example, return the row divider 130 to the operating position illustrated in FIG. 3. It should be further appreciated that the actuator 310 may be coupled to the row divider 130 such that retraction of the actuator rod 411 causes the row divider 130 to pivot such that the tip 331 raises relative to the ground and extension of the actuator rod 411 causes the row divider to pivot such that the tip 331 lowers relative to the ground.

To activate the actuator 310 and pivot the row divider 130, a controller 170 (illustrated in FIG. 1) that is carried remotely from the header 110 outputs an electronic signal to selectively activate the actuator 310. As used herein, the controller 170 is "carried remotely" from the header 110 in the sense that the controller 170 is not carried by the header 110 when the header 110 is detached from the chassis 101 of the harvester 100. Thus, the controller 170 is remote from the header 110 (and the actuator 310) and may also be referred to as a "remote controller." In this respect, the actuator 310 is configured to be selectively activated by the remote controller 170 to pivot the coupled crop divider 130 relative to the header frame 111. In some embodiments, the controller 170 is electrically coupled to the actuator 310 and activates the actuator 310 directly by outputting an electronic signal that is received by the actuator 310, causing the actuator 310 to extend or retract the actuator rod 411 and pivot the row divider 130. As used herein, the controller 170 is "electrically coupled" to the actuator 310 in the sense that the electronic signal from the controller 170 is received by the actuator 310 after being output by the controller 170, which may be via a wired electronic connection, a wireless electronic connection, some combination of wired and wireless electronic connections, or via connection to an intermediary such as a signal router and/or a signal converter. Alternatively, the controller 170 may activate the actuator 310 by outputting an electronic signal to the power source 160 of the harvester 100 (or the associated power source 314 of the header 110) powering the actuator 310, which causes the power source 160, 314 to deliver power to the actuator 310 and produce a corresponding extension or retraction of the actuator rod 411. It should thus be appreciated that the controller 170 may selectively activate the actuator 310 in a variety of ways and does not necessarily need to be electronically coupled directly to the actuator 310 in order to activate the actuator 310.

In some embodiments, the controller 170 is part of, or operatively coupled to, a control system 171 that is located in an operating cab 180 (illustrated in FIG. 1) of the harvester 100. The control system 171 may include an input device 172, such as a touchscreen display, that may be used to control various functions of the harvester 100, including pivoting of the row dividers 130. In some embodiments, the controller 170 is configured to selectively activate multiple divider lifters, which may each be an actuator 310, simultaneously to cause pivoting of multiple row dividers 130. For example, the control system 171 may allow an operator to specify individual row dividers 130 to raise, with the controller 170 selectively activating the divider lifters 310 associated with the specified row dividers 130 to raise the specified row dividers 130.

In some embodiments, the row dividers 130 may be categorized into sub-groups for convenient activation of multiple related row dividers 130. For example, the row dividers 130 adjacent to a lateral end 119A of the header 110 may be categorized as a group of "right-side" row dividers R and the row dividers 130 adjacent to an opposite lateral end 119B of the header may be categorized as a group of "left-side" row dividers L. The controller 170 may be configured to selectively activate each of the divider lifters 310 of the right-side row dividers R independently of the other divider lifters 310 so the right-side row dividers R simultaneously pivot relative to the header frame 111 while the other row dividers 130 do not pivot. Similarly, the controller 170 may be configured to selectively activate each of the divider lifters 310 of the left-side row dividers L independently of the other divider lifters 310 so the left-side row dividers L simultaneously pivot relative to the header frame 111 while the other row dividers 130, including the right-side row dividers R, do not pivot. In this sense, the controller 170 may be configured to selectively activate one or more divider lifters 310 independently of at least one other divider lifter 310 to selectively pivot some, but not all, of the row dividers 130 relative to the header frame 111 simultaneously. Similarly, each of the divider lifters 310 may be configured to activate independently of at least one of the other divider lifters 310.

From the foregoing, it should be appreciated that activating the divider lifters 310 remotely, such as with the remote controller 170, provides a convenient and easy way of raising and lowering the row dividers 130 to, for example, prepare the header 110 for transport. Previously known row dividers are pivotable relative to the header frame, but must be manually pivoted by an operator. To pivot the row dividers, the operator, who is generally in the operating cab during harvesting, must leave the operating cab and manually pivot each row divider individually. For headers that include 12 or more row dividers, manually pivoting each of the row dividers may require a significant amount of time over the course of a harvesting season. On the contrary, the row dividers 130 of the header 110 disclosed herein may be raised for transport as the harvester 100 is carrying the header 110 to the transport vehicle so the header 110 only needs to be detached from the harvester 100 upon arrival at the transport vehicle. Further, the operating cab is generally several feet off the ground so the operator exiting and re-entering the operating cab presents a potential safety hazard if, for example, the operator is fatigued. Thus, activating the divider lifter(s) 310 remotely, such as from the operating cab 180, can save an operator a significant amount of time and reduce the safety risk associated with entering and exiting the operating cab.

Further, activating the divider lifters 310 remotely, such as from the operating cab 180, allows for on-the-go pivoting adjustment of the row dividers 130. On-the-go pivoting adjustment of the row dividers 130 may be helpful when less than an entire width of the header 110 is used to harvest rows of crop. For example, a known 16-row header may be used to harvest corn from a field until only 3 rows of standing corn remains in the field. Because the threshing and separating functions of the harvester depend on the harvester being fully loaded with incoming crop material, the operator may drive the harvester at a higher rate of speed than normal to keep the harvester fully loaded with incoming crop material from fewer than 16 rows. When traveling at the higher rate of speed, objects in the field, such as large rocks, are not only more difficult to detect and avoid than when traveling at the normal rate of speed, but tend to cause more damage due to the increased rate of speed.

By activating the divider lifters 310 remotely, such as from the operating cab 180, an operator can pivot the row dividers 130 that are not being used away from the ground while the harvester 100 is traveling in order to reduce the risk of the unused row dividers contacting objects in the field at a higher rate of speed. Such on-the-go adjustment of the row dividers 130 does not significantly impact the speed at which the harvester 100 can harvest an entire field because the adjustment can be made while the harvester 100 is in motion, such as when the harvester 100 is traveling through headlands. Thus, the header 110 and the harvester 100 disclosed herein provide an operator a convenient way to reduce the risk of unused row dividers being damaged while harvesting from fewer rows of crops than a maximum number of rows that the header 110 is configured to simultaneously collect.

It should be appreciated that while the divider lifters, such as actuators 310, are previously described as being activated by the controller 170 after, for example, operator input into the touchscreen display 172 of the control system 171, in some embodiments the controller 170 is configured to automatically activate one or more of the actuators 310 to pivot the respectively coupled row dividers 130 without additional operator input. For example, the controller 170 may be configured to control travel of the harvester 100 through a field, such as by utilizing GPS and a pre-defined travel path through the field, and automatically activate the actuators 310 to raise the row dividers 130 as the harvester 100 travels through headlands of the field. In some embodiments, the controller 170 may be operatively coupled to one or more crop detecting sensors 290 (illustrated in FIG. 2), such as optical sensors, carried by the header 110 adjacent to each of the row units 113. The controller 170 may be configured to detect that one or more of the row dividers 130 is not being utilized based on input from the crop detecting sensors 290 and activate the respective divider lifter(s) 310 of the unutilized row divider(s) 130 to raise the unutilized row divider(s) 130 and reduce the risk of the unutilized row divider(s) 130 being damaged. It should thus be appreciated that the controller 170 may be configured in a variety of different ways for selectively activating one or more of the divider lifters 310 without additional operator input.

Referring now to FIGS. 5-10, another exemplary embodiment of a divider lifter 510 coupled to a row divider 130 by an exemplary embodiment of a divider support 520 to pivot the row divider 130 is illustrated. The divider lifter 510 includes a winder 511, which is illustrated in further detail in FIG. 6, that connects to the divider support 520 bearing on the row divider 130 and is illustrated separately in FIG. 7. The winder 511 may connect to the divider support 520 via a tensioner 512, which may be a cable, a chain, or other type of element that transmits tension to the divider support 520 from the winder 511. The divider support 520 is pivotably coupled to the header frame 111 via a pivot bar 521, which defines a pivot axis PA of the divider support 520. To pivot the divider support 520 about the pivot axis PA defined by the pivot bar 521, the divider support 520 may have one or more pivot legs 522A, 522B each having a corresponding pivot opening 523A, 523B that holds the pivot bar 521 therein and allows the divider support 520 to pivot about the pivot bar 521. The tensioner 512 may be held within a tensioner opening 721 formed in a connection portion 722 of the divider support 520 to connect the tensioner 512 to the divider support 520. The row divider 130 is also pivotably coupled to the header frame 111 and may have a pair of pivot slots 531 formed therein that hold the pivot bar 521, which also defines a pivot axis PA of the row divider 130, to allow the row divider 130 to pivot about the pivot bar 521. In some embodiments, a spring 540, such as a tension spring, is coupled to the row divider 130 to provide a downward bias on the row divider 130 and mitigate, e.g., the tendency of the row divider 130 to lift as the harvester 100 travels on uneven terrain.

To pivot the row divider 130, the winder 511 may include a shaft 513 rotatably connected to a rotary actuator 514 that is configured to rotate the shaft 513 about a longitudinal axis SLA of the shaft 513. The shaft 513 may connect to a frame member that is located rearwardly of the row unit 113, allowing for crop to enter and flow through the row unit 113 with minimal, if any, interference due to the shaft 513. The rotary actuator 514 may be an electric actuator, a pneumatic actuator, or a hydraulic actuator that is activated by a remote controller, such as the controller 170, and be powered by the power source 160 of the harvester 100 or an associated power source carried by the header 110, similarly to the previously described divider lifter 310.

Figure 8:
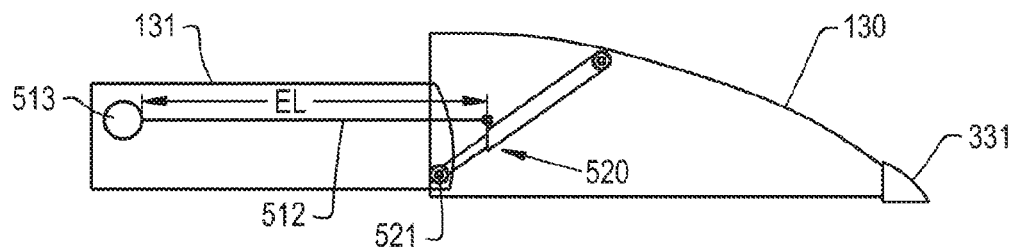
FIG. 8 is a side view of the row divider coupled to the divider lifter illustrated in FIGS. 5-7, the row divider being in an operating position.
Figure 9:
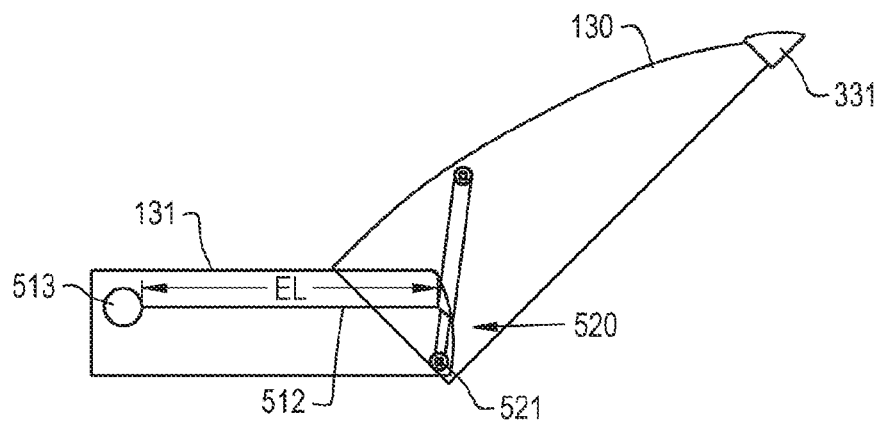
FIG. 9 is a side view of the row divider and the divider lifter illustrated in FIG. 8 when the row divider is in a raised position.

Upon activating, the rotary actuator 514 rotates the shaft 513, which has the tensioner 512 wound about it, to decrease or increase an effective length EL of the tensioner 512 relative to the connected divider support 520. The change in the effective length EL of the tensioner 512 causes pivoting of the divider support 520 about the pivot bar 521 and a corresponding pivoting of the row divider 130 due to the divider support 520 bearing on the row divider 130. For example, when the effective length EL of the tensioner 512 decreases due to rotation of the shaft 513, a pulling force is exerted on the divider support 520 that pivots the divider support 520 such that the tip 331 of the row divider 130 is raised relative to the ground, which may pivot the row divider 130 from the operating position to the raised position as illustrated in FIGS. 8-9. To return the row divider 130 to the operating position from the raised position, the shaft 513 of the winder 511 rotates in the opposite direction to increase the effective length EL of the tensioner 512 and allow the divider support 520 and the row divider 130 to pivot back to the operating position.

Figure 10:
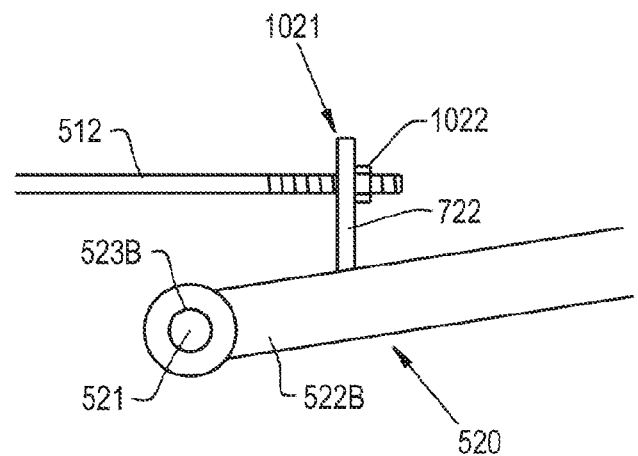
FIG. 10 is a side view of the divider support illustrated in FIG. 7 provided with a level adjuster.

In some embodiments, the tensioner 512 connects to a level adjuster 1021, illustrated in FIG. 10 as a threaded bolt, that is held in the tensioner opening 721 and has a corresponding threaded nut 1022 to increase or decrease the effective length EL of the tensioner 512 by rotating the bolt 1021. The level adjuster 1021 allows fine tuning of the level of the row divider 130 to compensate for various factors such as, for example, manufacturing variations. The operation of such level adjusters is known, so further description is omitted for brevity.

Figure 11:
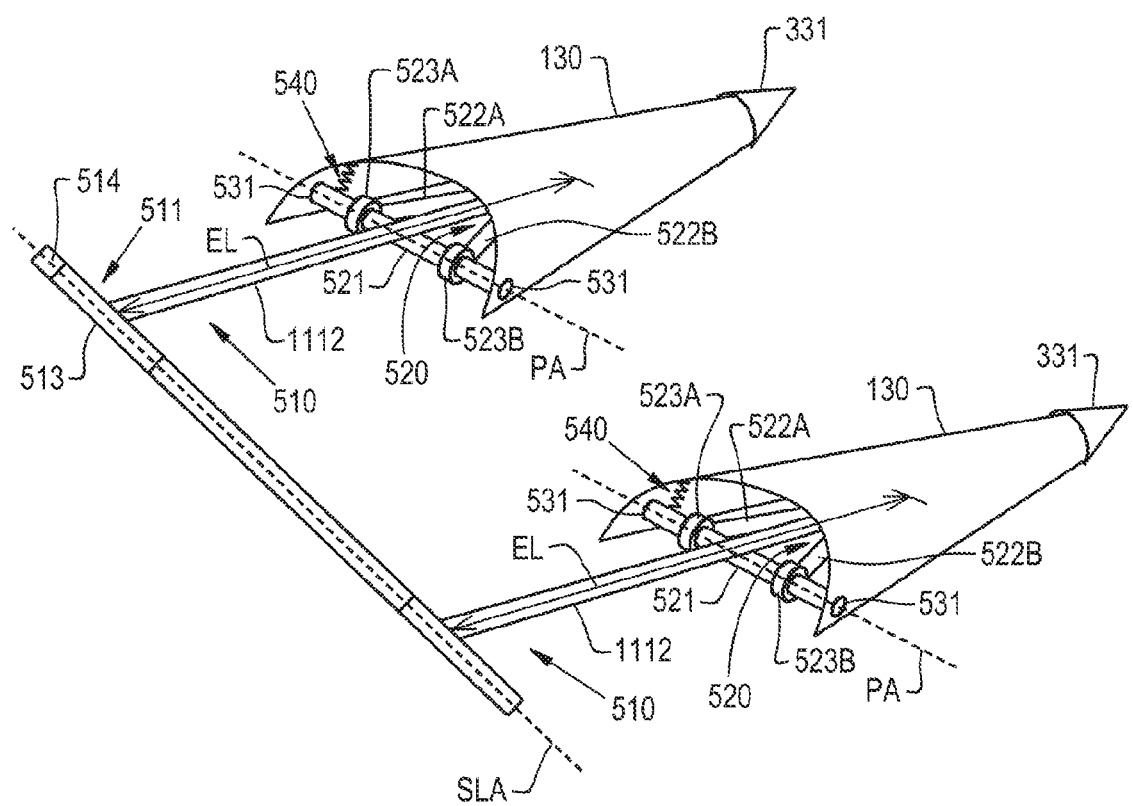
FIG. 11 is a perspective view of multiple row dividers of the harvester illustrated in FIG. 1 that are coupled to a single divider lifter for simultaneous pivoting.

Referring now to FIG. 11, it is illustrated how multiple row dividers 130 may be pivoted by a single winder 511. As can be seen, each of the row dividers has a respective divider support 520 bearing on the row divider 130 and connected to the winder 511 by a respective tensioner 1112. In such a configuration, activation of the rotary actuator 514 can cause pivoting of multiple row dividers 130, reducing the number of actuators needed to raise the row dividers 130. In some embodiments, sub-groups of row dividers 130 each have an associated winder to pivot each of the row dividers 130 of the sub-group simultaneously. For example, divider supports bearing on the right-side row dividers R may each be coupled to a single winder by a respective tensioner such that rotation of the single winder causes pivoting of each of the row dividers in the right-side row dividers R. It should be appreciated that pivoting of multiple row dividers 130 by rotating a single winder can be effected in many different ways, and the previously described configuration is only one exemplary configuration.

Figure 12:
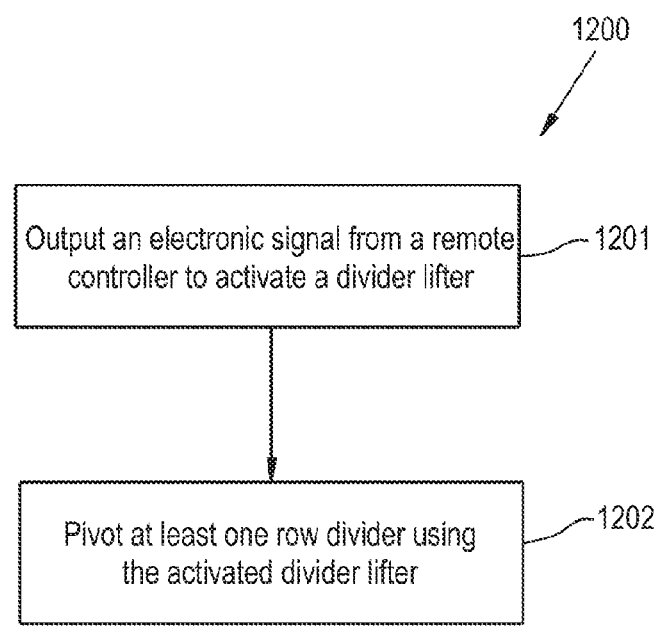
FIG. 12 is a flow chart illustrating an exemplary embodiment of a method of adjusting a row divider of a header of an agricultural harvester.

Referring now to FIG. 12, an exemplary embodiment of a method 1200 of adjusting at least one row divider 130 of a header 110 of an agricultural harvester 100 is illustrated. The method 1200 generally includes outputting 1201 an electronic signal from a controller 170 that is remote from the header 110 to activate a divider lifter 310, 510 and pivoting 1202 the at least one row divider 130 using the activated divider lifter 310, 510. In some embodiments, the divider lifter 310, 510 directly receives the output electronic signal from the controller 170 to activate and pivot the row divider(s) 130. As previously described, the activated divider lifter 310, 510 may pivot a single row divider 130 or simultaneously pivot multiple row dividers 130. In some embodiments, the controller 170 is part of a control system 171 located in an operating cab 160 of the harvester 100, allowing an operator to conveniently activate the divider lifter 310, 510 to pivot one or more row dividers 130 to, for example, prepare the header 110 for transport or raise unutilized row dividers 130 further from the ground. In some embodiments, the activated divider lifter 310 directly pivots the row divider 130 by extending or retracting an actuator rod 411 of the divider lifter 310. In some embodiments, the activated divider lifter 510 pivots the row divider 130 by winding a tensioner 512 about a shaft 513 to pull on a divider support 520 bearing on the row divider 130. It should be appreciated that while the divider lifter 310, 510 is illustrated and described as being activated by a controller 170 that is carried by the harvester 100 remotely from the header 110, the divider lifter 310, 510 can also be activated by an electronic signal output by a controller that is remote from the harvester 100.

It is to be understood that, in some embodiments, the steps of the method 1200 are performed by the controller 170 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 170 described herein, such as the method 1200, is implemented in software code or instructions which are tangibly stored on a tangible computer readable medium. The controller 170 loads the software code or instructions via a direct interface with the computer readable medium or via a wired and/or wireless network. Upon loading and executing such software code or instructions by the controller 170, the controller 170 may perform any of the functionality of the controller 170 described herein, including any steps of the method 1200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A header for an agricultural harvester, comprising:
a header frame;
at least one crop remover carried by the header frame;
a plurality of row dividers pivotably carried by the header frame;
at least one divider lifter coupled to at least one row divider of the plurality of row dividers and configured to activate in order to pivot the at least one row divider relative to the header frame, the at least one divider lifter configured to be selectively activated by a remote controller; and
at least one divider support bearing on the at least one row divider such that movement of the at least one divider support causes pivoting of the at least one row divider;
wherein the at least one divider lifter comprises a winder, the winder is connected to the at least one divider support via at least one respective tensioner, the at least one respective tensioner is configured to wind about a shaft of the winder, and the shaft of the winder is configured to rotate to change an effective length of the tensioner.

2. The header of claim 1, wherein the at least one divider support comprises a plurality of divider supports, the at least one respective tensioner comprises a plurality of respective tensioners, and each of the plurality of divider supports bears on a respective row divider of the plurality of row dividers and is connected to the winder via a respective tensioner of the plurality of respective tensioners.

3. The header of claim 1, wherein the at least one divider lifter comprises a plurality of divider lifters, each of the plurality of divider lifters being configured to activate independently of at least one of the other divider lifters.

4. The header of claim 1, wherein the at least one divider lifter is configured to activate upon receiving an electronic signal directly from the remote controller.

5. An agricultural harvester, comprising:
a chassis;
a header carried by the chassis, the header comprising:
  a header frame;
  at least one crop remover carried by the header frame;
  a plurality of row dividers pivotably carried by the header frame; and
  at least one divider lifter coupled to at least one row divider of the plurality of row dividers and configured to activate in order to pivot the at least one row divider relative to the header frame;
a controller carried by the chassis remotely from the header and configured to selectively activate the at least one divider lifter by outputting a signal to the at least one divider lifter or to a power source coupled to the at least one divider lifter; and
one or more crop detecting sensors operatively coupled to the controller, wherein the controller is configured to detect whether the at least one row divider is unutilized based on feedback from the one or more crop detecting sensors, and the controller is configured to selectively activate the at least one divider lifter in response to determining the at least one row divider is unutilized.

6. The agricultural harvester of claim 5, wherein the at least one divider lifter comprises an actuator directly coupled to the at least one row divider.

7. The agricultural harvester of claim 6, further comprising a row hood carried by the header frame, the actuator being pivotably coupled to the row hood and fixedly coupled to the at least one row divider.

8. The agricultural harvester of claim 5, further comprising at least one divider support bearing on the at least one row divider such that movement of the at least one divider support causes pivoting of the at least one row divider.

9. The agricultural harvester of claim 8, wherein the at least one divider lifter comprises a winder, and the winder is connected to the at least one divider support via at least one respective tensioner.

10. The agricultural harvester of claim 9, wherein the at least one divider support comprises a plurality of divider supports, the at least one respective tensioner comprises a plurality of respective tensioners, and each of the plurality of divider supports bears on a respective row divider of the plurality of row dividers and is connected to the winder via a respective tensioner of the plurality of respective tensioners.

11. The agricultural harvester of claim 5, wherein the at least one divider lifter comprises a plurality of divider lifters, each of the plurality of divider lifters being configured to activate independently of at least one of the other divider lifters.

12. The agricultural harvester of claim 5, further comprising an operating cab carried by the chassis, the controller being located in the operating cab.

13. The agricultural harvester of claim 5, wherein the controller is electrically coupled to the at least one divider lifter.

14. An agricultural harvester, comprising:
a controller configured to be carried by a chassis of the agricultural harvester remotely from a header of the agricultural harvester, wherein the controller is configured to:
  detect whether at least one row divider of a plurality of row dividers is unutilized based on feedback from one or more crop detecting sensors, wherein each of the plurality of row dividers is configured to be pivotably carried by a header frame of the header; and
  selectively activate at least one divider lifter in response to determining the at least one row divider is unutilized by outputting a signal to the at least one divider lifter or to a power source coupled to the at least one divider lifter, wherein the at least one divider lifter is configured to couple to the at least one row divider and to activate to pivot the at least one row divider relative to the header frame.

* * * * *